July 20, 1971 G. L. WICKER ET AL 3,594,265
MANUFACTURE OF THERMOPLASTIC SHEET
Filed Oct. 24, 1967

INVENTORS
GEORGE LEONARD WICKER
MALCOLM TATE

BY Sughrue, Rothwell, Mion, Zinn & Macpeak
ATTORNEYS

United States Patent Office 3,594,265
Patented July 20, 1971

3,594,265
MANUFACTURE OF THERMOPLASTIC SHEET
George L. Wicker and Malcolm Tate, Rochdale, England, assignors to Turner Brothers Asbestos Company, Limited, Manchester, England
Continuation-in-part of abandoned application Ser. No. 463,009, June 10, 1965. This application Oct. 24, 1967, Ser. No. 677,695
Claims priority, application Great Britain, Oct. 26, 1966, 48,101/66
Int. Cl. B32b 5/16
U.S. Cl. 161—170
8 Claims

ABSTRACT OF THE DISCLOSURE

A rigid sheet comprising a polymeric constituent which is wholly or predominantly vinyl chloride homopolymer or is formed from monomers in which vinyl chloride predominates with fibre reinforcement is prepared by forming a dough-like mass of the polymeric constituent in the form of a solution or in the form of a mixture of a solution and a dispersion in water with the fibre, and building up the mass in very thin laminations on a hot calender roll. The part of the polymeric constituent which is soluble in an organic solvent may be low K-value polyvinyl chloride, or a copolymer of vinyl chloride and vinylidene chloride, or a copolymer of vinyl chloride and vinyl acetate.

---

This application is a continuation-in-part of our co-pending application Ser. No. 463,009, filed June 10, 1965 (now abandoned), for Manufacture of Thermoplastic Sheet.

Flat thermoplastic sheets are widely used as mouldings and as surface coverings, for instance for walls and floors. In particular, there is a demand for rigid strong sheets capable of resisting fire and so suitable for building purposes, and strength can be obtained by reinforcing the thermoplastic by fibres. Fire resistance requires a chlorine-containing polymer, and it is well known that polyvinyl chloride presents good resistance to fire, and has the advantage of being cheap and readily available. It is, however, rigid only if it is free or substantially free from plasticiser.

One method of forming a rigid reinforced thermoplastic sheet comprises forming pellets of the thermoplastic material containing the reinforcing fibres, and then moulding these pellets to form a sheet. Ideally, injection moulding would be used, but the apparatus required for making large sheets would be highly expensive, so that in practice large sheets are made by die pressing. This method results in a sheet in which the fibres are uniformly dispersed throughout, but are oriented in all directions. Any fibres oriented in the plane normal to that of the sheet, that is to say the C-direction, add nothing to the strength properties of the sheet and may in fact harm the properties of the sheet, and ideally all the fibres in a reinforced thermoplastic sheet should lie in the plane of the sheet. Also, sheets made by injection moulding may suffer from internal stresses resulting from irregular flow of the plastic. Moreover, it is impossible to form sheets with a reinforcement of long fibres because of the inevitable fibre degradation which occurs during an injection moulding process. Sheets made from pellets by moulding are thus not entirely satisfactory.

Another method of producing reinforced thermoplastic sheets comprises impregnating a cloth or web of fibres with a solution or dispersion of a thermoplastic material, but the final product is not then suitable for moulding since the cloth or web reinforcement resists the necessary flow of thermoplastic. In addition, better properties result if the thermoplastic is reinforced by individual, dispersed fibres than by a cloth or web. Inevitably many of the fibres in a cloth or web will not be entirely oriented in the plane of the sheet, although the orientation of the fibres will generally be better than in sheets made by moulding pellets.

Another conventional method for producing reinforced thermoplastic sheets involves calendering to a sheet a mix of the thermoplastic material and fibres on a multi-roll reduction calender by which the thickness of the sheets is progressively reduced. This yields a sheet in which the fibres are thoroughly dispersed and largely oriented in the plane of the sheet. However, the repeated crushing action of the calendering rolls will damage the fibres, and the method still produces a sheet having some fibres oriented in the C-direction, since the thick sheets produced between the first calendering rolls will have a substantial component of fibres in the C-direction and this component will never be completely lost no matter how much the thickness of the sheet is reduced. Also, to produce the initial mix, the reinforcing fibres are usually blended into a melt of the thermoplastic material; it is difficult to attain proper mixing, and wetting of the fibres, and considerable degradation of the fibres inevitably occurs.

We aim at producing flat rigid sheets of a polymeric constituents which is wholly or predominantly vinyl chloride homopolymer or is formed from monomers in which vinyl chloride predominates and reinforcing fibres, the polymeric constituent by itself being rigid at room temperature when not reinforced. It is not possible to apply the reduction calendering method to the production of a fibre-reinforced sheet of such polymers unless the polymers have been plasticised, but then the resultant sheet is no longer rigid. Since unplasticised rigid vinyl chloride polymers and copolymers, when heated, soften only to a very viscous state, it is impossible satisfactorily to mix reinforcing fibres into a melt of them, as many fibers are damaged thereby and glass fibres disintegrate altogether. In addition, calendering of such a mixture would only complete the fibre degradation and no useful reinforcement would result. Thus, although articles of reinforced vinyl chloride polymer or copolymer, for instance floor tiles, have been made by this method, they have all been flexible because of the presence of a substantial amount of plasticiser or because the vinyl chloride polymer or copolymer has been of low melting point and thus itself naturally flexible.

The present invention provides as a novel product a rigid sheet comprising a polymeric constituent which is wholly or predominantly vinyl chloride homopolymer or is formed from monomers in which vinyl chloride predominates and reinforcing fibres, the polymeric constituent by itself being rigid at room temperature when not reinforced, and the fibres being uniformly dispersed throughout and all lying in or at least substantially in the plane of the sheet. Such a sheet has good non-drip fire-retardant properties and is suitable for moulding or for use as a building panel.

The invention will be described in the following detailed description taken in connection with the accompanying drawing in which.

Figure 1:
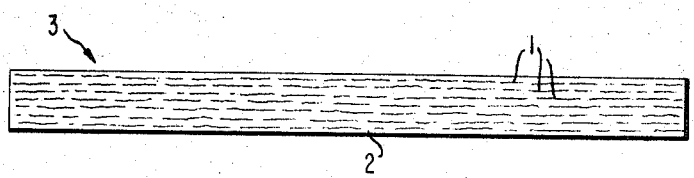
FIG. 1 is an edge view of the rigid sheet of this invention.
Figure 2:
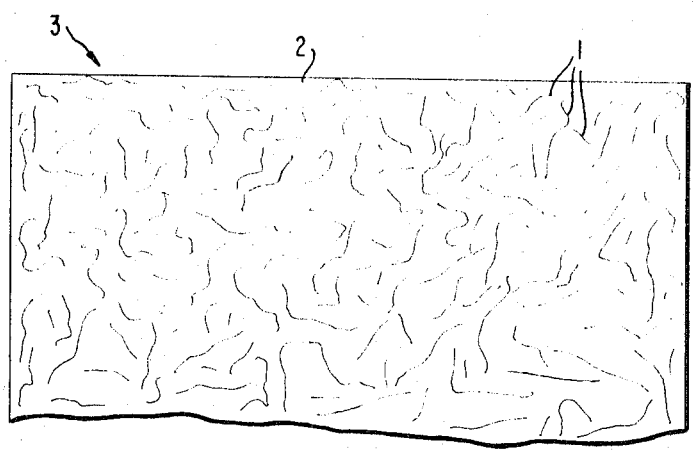
FIG. 2 is a partial plan view of the sheet of FIG. 1.

A rigid sheet 3 is formed with loose reinforcing fibers 1 within a polymeric material 2. As shown in the drawing, the fibres are uniformly dispersed throughout and lie in, or at least substantially in, the plane of the sheet.

In making sheets according to the invention the fibres are mixed with the polymeric constituent in liquid form, by which is meant in the form of a solution in a volatile organic solvent and a dispersion in water, but not as a melt of molten polymers, to form a dough-like mass, and this mass is formed into a rigid sheet. The polymeric constituent is a material which is itself rigid at room temperature when unreinforced, and must therefore contain little or no plasticiser. Any desired reinforcing fibres, including glass fibres, can be incorporated into the polymer sheet by mixing them with the polymeric constituent while it is in this liquid form, and the fibres may be thus dispersed more evenly than is possible by mixing them into a melt of polymer. Further, by mixing fibres into the polymeric constituent in this liquid form, a much more intimate mixture can be achieved since the fibres are effectively wetted.

To form a rigid sheet from the dough-like mass we prefer to build up the mass continuously in thin laminations on a hot calender roll, cut the sheet thus formed on the roll, remove it from the roll, and allow it to cool to a rigid sheet. It is necessary that successive laminations shall adhere to one another, and to ensure that they have sufficient tackiness for this it is necessary that at least part of the polymeric constituent shall be in solution in a volatile organic solvent. However, this presents a serious problem since conventional high-molecular weight rigid polyvinyl chloride is not soluble in any of the common volatile organic solvents. We solve this problem by using, as a part of the polymeric constituent, a copolymer of vinyl chloride with another monomer, the copolymer being soluble in a volatile organic solvent and used as a solution in that solvent, or a low-molecular weight vinyl chloride homopolymer having a K-value of 40–45, which is partially or completely soluble in, or swollen by, organic solvents such as toluene, acetone, methyl ethyl ketone, benzene and other aliphatic and aromatic hydrocarbons and ketones.

Although it is essential to ensure that succesive laminations adhere well during the calendering it is also necessary to ensure that the sheet formed on the calender roll does not stick to the roll but can be removed after calendering. Water serves as a release agent to prevent this and is conventionally introduced into the dough-like mass as the liquid phase of a polyvinyl chloride emulsion.

Vinyl chloride homopolymer can be prepared with any desired molecular weight, and any polyvinyl chloride can be defined in terms of a K-value, this value being dependent on the molecular weight. K is defined as 1000$k$, and $k$ is calculated from the expression $$\log (\text{relative viscosity}) = \frac{75k^2}{1+1.5kC} + k$$

in which $$\text{relative viscosity} = \frac{\text{viscosity of solution}}{\text{viscosity of solvent}}$$

and C is the concentration of the solution in grams of solute per 100 cc. of solution, all measurements being made in nitrobenzene solution.

Some copolymers of vinyl chloride and vinylidene chloride are soluble in toluene, and we may use these as a part of the polymeric constituent. One such copolymer is sold under the trademark "Breon 222." Another copolymer which can be used is that of vinyl chloride with vinyl acetate, and the solvent we use with this copolymer is methylethyl ketone or a mixture of this with a hydrocarbon fraction. It is desirable to keep the amount of copolymer of vinyl chloride down to a minimum, since it detracts from the strength of rigid polyvinyl chloride with which it is incorporated and it is generally more expensive than vinyl chloride homopolymer.

When maximum fire resistance is an essential property of the sheet we prefer that all the polymer in it shall be polyvinyl chloride. Vinyl chloride homopolymer having a K-value of 40 to 45 is rigid by itself at room temperature (as stated above) and may therefore form all the polymeric constituent of the sheet; however the mechanical properties of such a homopolymer are not good, and it is much better to use a major proportion of a vinyl chloride homopolymer of higher molecular weight. Normally we prefer to use from 15 to 25 parts by weight of vinyl chloride homopolymer of K-value 40 to 45 with 85 to 75 parts by weight of vinyl chloride homopolymer of higher molecular weight. The sheets then have the best resistance to fire combined with rigidity and weathering properties. Considerable advantages are gained by the use of low K-value polyvinyl chloride, among them ease of manufacture of the sheet, since the tackiness of the dough-like mass is not critical, and enhanced thermal stability and high heat-distortion point of the final sheet. A single dough-like-mass, the polymeric constituent of which contains a suitable proportion of a solution of the low K-value polyvinyl chloride in an organic solvent, has adequate "tack," adhesion and stripping properties.

For some purposes fibre-reinforced sheets do not require resistance to fire, but it is nevertheless very desirable to make them of a polymeric constituent that is predominantly polyvinyl chloride because of its resistance to weathering, an example of the use of such a sheet being as a road sign. It is then possible to replace part of the higher molecular weight vinyl chloride homopolymer with a copolymer of acrylonitrile and butadiene, to be used in conjunction with the low-molecular-weight homopolymer of vinyl chloride. When this copolymer is used, the strength and handling characteristics of the sheeted dough-like-mass on the calender are improved, and the impact strength and mouldability of the final sheet are enhanced. The total proportion of this copolymer in the polymeric constituent is not normally more than 10%. In every case polyvinyl chloride of low K-value forms at least 5%, and most advantageously at least 10%, of the polymeric constituent.

If neither maximum resistance to fire nor maximum resistance to weathering is of paramount importance, the polymeric constituent, while still predominantly vinyl chloride homopolymer, may also include up to 10% by weight of polymers or copolymers other than low K-value polyvinyl chloride with or without acrylonitrile/butadiene, in order to allow the sheets to be more easily consolidated or moulded or to improve their impact strength or toughness while only slightly reducing their fire and weather resistance. Examples of such polymers or copolymers which may be incorporated include copolymers of acrylonitrile, butadiene and styrene, copolymers of ethylene and vinyl acetate, copolymers of vinyl chloride and vinyl fumarate, polyacrylates and polymethacrylates, chlorinated polyethylenes and the copolymers of styrene and the diester of maleic acid and a $C_8$ alcohol sold under the trademark "Alphanol." These substances may most conveniently be added as solids or latices.

Sheets predominantly of vinyl chloride homopolymer may tend to be rather brittle when unlaminated or sufficiently thin for vacuum moulding. To overcome this drawback, vinyl chloride homopolymer may be wholly or mainly replaced by one or more vinyl chloride copolymers.

It is very difficult to keep the quantity of vinyl chloride copolymer to the minimum necessary for adhesion of successive laminations and thus to preserve the properties of rigid polyvinyl chloride without reducing the tackiness of the mass so much that the calendered sheet is stripped from, or at least buckles on, the calender roll as successive laminations are applied. To overcome this difficulty we prefer to form the sheet in this case from two mixes of different compositions. The initial laminations, which may be termed a base layer, are formed from a mix containing a relatively high proportion of vinyl chloride copolymer and of a constitution such as to give satisfactory adhesion of the laminations and sufficient adhesion between the first lamination and the calender roll to prevent the sheet buckling or stripping during calendering but not sufficient to cause difficulties in its subsequent removal. The remainder of the laminations, which may be termed the body layer, are formed from a mix which contains a relatively low proportion of the vinyl chloride copolymer while giving adequate adhesion between successive laminations, and which preferably contains as little of the vinyl chloride copolymer as possible.

In order to avoid having excess water present, we prefer to use the solution of vinyl chloride copolymer as the liquid in which at least part of the vinyl chloride homopolymer is dispersed. For instance polyvinyl chloride powder or paste can be dispersed in the copolymer solution.

A particularly useful composition is one in which the polymeric constituent is a mixture of the copolymers of vinyl chloride with vinylidene chloride and with vinyl acetate. These two copolymers are not both soluble in any one solvent, and so the general method described for the production of sheets predominantly of polyvinyl chloride can advantageously be adopted, one copolymer being in solution and the other in dispersion. In a similar manner, sheets can be produced from any other combination of copolymers, with or without homopolymers of vinyl chloride, provided that in the monomers from which the complete polymeric constituent is formed vinyl chloride predominates and at least one of the copolymers is soluble in a volatile organic solvent. In the production of a sheet of copolymer of vinyl chloride and vinylidene chloride and copolymer of vinyl chloride and vinyl acetate, the vinylidene chloride copolymer is preferably present in solution in toluene and the vinyl acetate copolymer in dispersion. We find we can calender a single dough-like mass fairly satisfactorily, but usually we prefer to use two dough-like mixes, one for forming a base layer and the other for forming a body layer, in the same way and for the same reasons as stated above. Further, we prefer to form all the vinyl acetate copolymer dispersion in the solution of vinylidene chloride copolymer, and to add water separately as a release agent.

It is desirable that in the sheet the proportion of the fibres should be as high as possible, and advantageously may be from 40 to 70% of the total sheet. These percentages, and all others in this specification, are by weight.

Inorganic fibres give better rigidity than organic fibres, and it is therefore preferably that the fibres should be wholly or predominantly inorganic, say at least 90% inorganic.

For moulding purposes, what is required is a sheet which which can be readily moulded to a desired shape. As the reinforcement is composed of fibres which can flow freely and individually in any direction during moulding, their movement is not restricted as is the case of preformed reinforcements such as woven cloths or mats. The ability of the fibres to flow enhances the mouldability of the sheets. For maximum mouldability, the fibres should be short, but on the other hand the longer the fibres are, the better are the strength properties. It is highly desirable that the inorganic fibres should contain a proportion of asbestos fibre, and asbestos preferably constitutes from 20 to 100% of the total fibre. Glass fibres are also suitand a mixture of asbestos and glass may also be used. We find that "opened" asbestos fibres of average length from 0.15 to 0.20 inch and chopped staple glass fibres from 0.25 to 1.0 inch are suitable. Mixtures of short fibres with varying proportions of longer fibres, say, up to 2", may also be used, and their use makes it possible to increase the strength properties without materially reducing the mouldability of the sheet produced. The longer fibres may be asbestos, glass or organic. Broadly there may be from 80 to 100% inorganic fibres less than 1 inch long and from 20 to 0% fibres between 1 and 2 inches long. For thin sheets which are to be vacuum-moulded we prefer to use Grade 5 fibres, these being short and having an average length of 0.06 inch.

In mixing the dough-like mass, homogeneous distribution of the fibres without degradation is important, and since the polymeric constituent is in liquid form this can be achieved quite readily. The mixers used should not have a violent action which would lead to excessive fibre degradation.

The calender used in forming the sheet may be of the type comprising a large steam-heated roll and a smaller water-cooled roll which can be moved apart from one another, dough-like mass being fed into the nip of the calender and the distance between the rolls being increased after each revolution, so that the mass is built up in thin laminations on the hot roll to the required thickness. The amount by which the distance between the rolls is increased in each revolution defines the thickness of each lamination. It is necessary that each lamination should be dried sufficiently before the next is applied, as otherwise an imperfect sheet may be produced. Each lamination must therefore be very thin, preferably from 0.0004 to 0.001 inch thick.

When two dough-like masses are to be used for forming the sheet, sufficient of the first is fed to the nip to form the base layer, and this is followed by the other mix for the formation of the body layer. Of course, there will be one or more laminations formed partly from one mix and partly from the other. Conveniently, the sheet produced from the two mixes may be about 0.031 inch thick, in which case it is preferred that the base layer should be about 0.003 inch thick, being formed in 5 or 6 laminations.

A surface layer may be applied to the laminated sheet by feeding a dough-like mass of the appropriate consistency to the nip of the calender when the dough-like mass intended for the body layer of the sheet is exhausted. This surface layer may be a resin mix, or a resin-fibre mix or a resin-filler mix. Its purpose is generally to provide a hard smooth surface on pressing, and also to provide an enhanced bond to any decorative vinyl film applied during pressing.

The sheet, as it is taken off the calender, may contain voids and some residual constituents which may spoil the physical properties, translucency, and general appearance. If so, it may be reheated and pressed to densify and polish it. This is preferably done in a hydraulic press, but may be done by passage through hot and cold rolls. However, it is usually desired to laminate several calendered sheets together to form a rigid sheet for moulding or, for example, for panelling, and the densification and polishing may then be combined with the laminating step. Preferably four calendered sheets are cross-laminated by hot pressing. Surface coverings, which may be decorative, may be laminated onto the sheets at the same time.

Since the dough-like mass is laid down on the calender roll in thin laminations, which are much shorter in depth than the length of the fibres, no fibre can be oriented in the C-direction, and all must lie in or at least substantially in the plane of the sheet. Not all the fibres will be in exactly this plane since there is bound to be some tilting of fibres within individual laminations on the calender roll. For instance, if the fibre length is 0.15 inch and each lamination is 0.0004 inch thick, any fibre can only lie at an angle of up to about 9 minutes of arc to the plane of the sheet. This is a negligible angle.

The method of the invention is advantageous in that calendering the dough-like mass to a sheet causes little or no degradation of the fibers to take place and leads to only slight alignment of the fibres, thus avoiding pronounced unidirectional strength. If however, undirectional strength is required some continuous glass filaments, such as those produced by spinning a large number of monofilaments together, may be fed into the nip of the calender to extend throughout the length of the resultant sheet; some loss of mouldability of the sheet results. Some examples will now be given:

EXAMPLE 1

The following is an example of the production of a rigid sheet suitable for moulding in a press or for use as a self supporting sheet.

150 lbs. of toluene, 65 lbs. of a copolymer of vinyl chloride and vinylidene chloride soluble in toluene, 10 lbs. of a 60% solution of a copolymer of styrene and the diester of maleic acid and a $C_8$ alcohol sold under the trademark "Alphanol," 29 lbs. of a powdered vinyl chloride homopolymer, 7 lbs. of a mixture of stabilisers for polyvinyl chloride, and 25 lbs. pulverised talc as a filler were mixed together in a suitable mixer of a type which causes minimum fibre degradation, the mixing being carried on for about 45 minutes. 35 lbs. of an aqueous vinyl chloride latex having a 50% solids content was used as the aqueous phase. To about one third of the solution phase in toluene were slowly added 105 lbs. of a mixture of asbestos fibres of Grades 3 and 4; this was then combined with the remainder of the solution phase in toluene and the mix stirred for 5 to 10 minutes. The aqueous phase was then added and mixed for a further two or three minutes. After the addition of pigment, the mix was then stirred for a further 15 to 20 minutes, after which time the dough-like mass was ready for calendering. A second mass was prepared in a similar manner, but in it the solution phase in toluene was prepared by mixing together 145 lbs. toluene, 20 lbs. of the vinyl chloride copolymer, 20 lbs. of the vinyl chloride homopolymer, 60 lbs. of powdered polyvinyl chloride solid paste, 8 lbs. of a mixture of stabilisers for polyvinyl chloride and 25 lbs. talc. The first dough-like mass described was transferred to the nip of a calender of the type previously described and a base layer having a thickness of 0.003 inch was formed. The second dough-like mass was then presented to the nip and a laminated sheet was built up to 0.003 inch.

Four sheets were laminated together to produce a board 0.12 inch thick which had the following properties (A and B referring to the axes in the plane of the sheet).

Tensile strength:
    A direction, 10,500 p.s.i.
    B direction, 10,300 p.s.i.
Flexural strength:
    A direction, 19,700 p.s.i.
    B direction, 15,200 p.s.i.
Young's modulus:
    A direction, $1.4 \times 10^6$ p.s.i.
    B direction, $1.3 \times 10^6$ p.s.i.
Flexural modulus:
    A direction, $1.9 \times 10^6$ p.s.i.
    B direction, $1.2 \times 10^6$ p.s.i.
Impact strength (notched):
    Edgewise, 1.6 ft. lbs./inch
    Flatwise, 3.2 ft. lbs./inch
Compressive strength: 32,000 p.s.i.

The aqueous phase of both dough-like mixes can contain minor amounts of other latices, such as for example, a butadiene-nitrile latex, although such inclusions may reduce the rigidity of the sheet. The styrene di-"Alphanol" maleate copolymer is included in the solution phase intended for the formation of the base layer to improve the tackiness of the mass.

EXAMPLE 2

The following is an example of the production of a thin sheet intended to be vacuum-moulded. 40 parts of copolymer of vinyl chloride and vinylidene chloride were dissolved in 150 parts of toluene, and 8 parts of a mixture of stabilisers and 6 parts of a talc were added. The mixture was then stirred with 80 parts of Grade 5 asbestos fibers in a spike mixer together with 120 parts of copolymer of vinyl chloride and vinyl acetate. The copolymer was found to swell but not to dissolve. Finally 20 parts of water were added to the mix.

This dough-like mass was used for the formation of a body layer on top of a base layer formed from the same dough-like mass as was used for this purpose in the previous example. The sheet was formed on a laminating calender in the manner described, laminations each 0.0006 inch thick being formed and built up to a sheet 0.05 inch thick.

EXAMPLE 3

145 lbs. of toluene, 20 lbs. of vinyl chloride homopolymer (K-value 40 to 45), 20 lbs. of vinyl chloride homopolymer (K-value 60 to 70). 60 lbs. of powdered vinyl chloride paste polymer, 8 lbs. 4 oz. of a stabiliser for polyvinyl chloride sold under the trademark "Ferroperm D," and 25 lbs. of powdered talc as filler were mixed together in a suitable mixer for about 45 minutes.

About one-third of the mixture was transferred to a mixer of a type designed to give minimum fibre degradation, and 105 lbs. of a mixture of asbestos fibre of Grades 3 and 4 were slowly added over a period of 20 minutes. The remainder of the mixture was then added and mixing continued for 10 minutes. 25 lbs. of an aqueous latex of polyvinyl chloride having 50% solids content were then added, and mixing continued for a further 5 minutes. Pigment was finally incorporated, and the mass mixed for a further 20 minutes, after which it was ready for calendering.

The dough-like mass was presented to the nip of a laminating calender, and a laminated sheet was built up to a thickness of 0.035 inch, each lamination being about 0.0004 inch thick; four such sheets were then laminated together in a press to form a board 0.125 inch thick. The board was tested, and found to have the following properties.

TEST RESULTS OF BOARD

Tensile strength: 15,900 p.s.i., in machine direction
Young's modulus: $2.5 \times 10^6$ p.s.i., in machine direction
Flexural strength: 26,000 p.s.i., in machine direction
Flexural modulus: $2.2 \times 10^6$ p.s.i., in machine direction
Izod impact strength:
    Flatwise, 5.0 ft. lb./in. of notch
    Edgewise, 2.8 ft. lb./in. of notch
Heat distortion point (264 p.s.i. fibre stress): 100° C.

EXAMPLE 4

The process described in Example 3 was repeated, except that 31¼ lbs. of a latex of an acrylonitrile/butadiene copolymer having 40% solids content were substituted for the 25 lbs. of aqueous latex of polyvinyl chloride.

The properties of the board were as follows.

Tensile strength: 16,100 p.s.i., in machine direction
Young's modulus: $2.6 \times 10^6$ p.s.i., in machine direction
Flexural strength: 24,000 p.s.i., in machine direction
Flexural modulus: $1.8 \times 10^6$ p.s.i., in machine direction
Izod impact strength:
    Flatwise, 6.0 ft. lb./in. of notch
    Edgewise, 2.9 ft. lb./in. of notch
Heat distortion point: 85° C.

The board was tougher and more resilient than that obtained in Example 3, and had improved impact strength.

EXAMPLE 5

The process described in Example 3 was again repeated, with the substitution of 25 lbs. of a latex of polyacrylate containing 50% of solids for the 25 lbs. of aqueous latex of polyvinyl chloride.

The properties of the board were as follows.

Tensile strength: 15,000 p.s.i., in machine direction
Young's modulus: $2.3 \times 10^6$ p.s.i., in machine direction
Flexural strength: 22,000 p.s.i., in machine direction
Flexural modulus: $1.7 \times 10^6$ p.s.i., in machine direction
Izod impact strength:
    Flatwise, 5.5 ft. lb./in. of notch
    Edgewise, 2.9 ft. lb./in. of notch
Heat distortion point: 88° C.

The board was found to have improved formability over that obtained in Example 3.

We claim:
1. A rigid sheet consisting essentially of a non-plasticized polymeric constituent and discrete reinforcing fibres, said polymeric constituent being selected from the group consisting of:
   a polymeric constituent which consists essentially of one or more vinyl chloride homopolymers and
   a polymeric constituent which consists essentially of a mixture of a vinyl chloride homopolymer and a copolymer of vinylidene chloride and vinyl chloride wherein a major proportion of the copolymer is vinyl chloride; said non-plasticized polymeric constituent by itself being rigid at room temperature when not reinforced, and said fibres being uniformly dispersed throughout and lying substantially in the plane of said sheet.
2. The rigid sheet of claim 1 which further contains a talc filler.
3. A rigid sheet according to claim 1 in which said polymeric constituent comprises at least 5% by weight of a vinyl chloride homopolymer having a K-value of 40 to 45.
4. A rigid sheet according to claim 3 in which the polymeric constituent comprises at least 10% by weight of the homopolymer having a K-value of 40 to 45.
5. A rigid sheet according to claim 4 the polymeric constituent of which is formed from 15 to 25 parts by weight of vinyl chloride homopolymer of a K-value of from 40 to 45, and 85 to 75 parts by weight of a vinyl chloride homopolymer of a higher molecular weight.
6. A rigid sheet according to claim 1 in which the discrete reinforcing fibres are inorganic fibres and in which from 20 to 100% by weight of the inorganic fibres is asbestos.
7. A rigid sheet according to claim 6 in which the inorganic fibers are a mixture of glass and asbestos when the asbestos content of the inorganic fibers is less than 100%.
8. A rigid sheet consisting essentially of a substantially non-plasticized polymeric constituent selected from the group consisting of:
   a polymeric constituent which consists essentially of a vinyl chloride homopolymer;
   a polymeric constituent which consists essentially of 15 to 25 parts of a first vinyl chloride homopolymer having a K value of 40 to 45 and 85 to 75 parts of a vinyl chloride homopolymer having a higher molecular weight than said first vinyl chloride homopolymer;
   a polymeric constituent which consists essentially of vinyl chloride homopolymers, at least 5% of said homopolymers having a K value of 40 to 45, and up to 10% of a copolymer of acrylonitrile and butadiene;
   a polymeric constituent which consists essentially of a vinyl chloride homopolymer and up to 10% of a polymer selected from the group consisting of copolymers of acrylonitrile, butadiene and styrene, copolymers of ethylene and vinyl acetate, copolymers of vinyl chloride and vinyl fumarate, polyacrylates, polymethacrylates, chlorinated polyethylenes and copolymers of styrene and the diester of maleic acid and a $C_8$ alcohol;
   a polymeric constituent consisting essentially of predominantly vinyl chloride homopolymer and a copolymer of vinyl chloride and vinyl acetate;
   and a polymeric constituent consisting essentially of predominantly vinyl chloride homopolymer and a copolymer of vinyl chloride and vinylidene chloride;
   and from 40 to 70%, based on the total sheet, of discrete reinforcing fibres, said substantially non-plasticized polymeric constituent by itself being rigid at room temperature when not reinforced by said reinforcing fibres, and said reinforcing fibres being uniformly dispersed throughout and lying substantially in the plane of said sheet, all percentages being by weight.

References Cited

UNITED STATES PATENTS

| | | | |
|---|---|---|---|
| 2,238,730 | 4/1941 | Hauffe | 264—175 |
| 2,342,556 | 2/1944 | Rockoff | 264—175X |
| 2,646,414 | 7/1953 | Gillespie | 260—899X |
| 2,771,388 | 11/1956 | Rocky et al. | 264—175X |
| 2,879,547 | 3/1959 | Morris | 161—189X |
| 3,000,754 | 9/1961 | Zentmyer | 260—899X |
| 3,074,114 | 1/1963 | Petry | 264—175 |
| 1,877,651 | 9/1932 | Eisenhardt | 161—170 |
| 2,791,600 | 5/1957 | Schwaegerle | 260—884 |
| 3,157,713 | 11/1964 | Leese | 260—884 |
| 3,247,289 | 4/1966 | Sears | 260—884 |
| 3,461,012 | 8/1969 | Wicker | 161—170X |

ROBERT F. BURNETT, Primary Examiner

R. O. LINKER, JR., Assistant Examiner

U.S. Cl. X.R.

156—243; 260—891, 897, 899; 264—175